(12) United States Patent
Pedrini

(10) Patent No.: US 9,950,399 B2
(45) Date of Patent: Apr. 24, 2018

(54) DEVICE AND PROCEDURE FOR MOVING A LOAD AND FOR THE CONTROL THEREOF

(71) Applicant: OMPE S.R.L., San Paolo D'Argon (IT)

(72) Inventor: Samuele Pedrini, San Paolo D'Argon (IT)

(73) Assignee: OMPE S.r.l., San Paolo D'Argon (IT)

( * ) Notice: Subject to any disclaimer, the term of this patent is extended or adjusted under 35 U.S.C. 154(b) by 0 days.

(21) Appl. No.: 15/312,359

(22) PCT Filed: May 28, 2015

(86) PCT No.: PCT/IB2015/054013
§ 371 (c)(1),
(2) Date: Nov. 18, 2016

(87) PCT Pub. No.: WO2015/181766
PCT Pub. Date: Dec. 3, 2015

(65) Prior Publication Data
US 2017/0080540 A1    Mar. 23, 2017

(30) Foreign Application Priority Data
May 29, 2014    (IT) .............................. MI2014A0997

(51) Int. Cl.
| | |
|---|---|
| *B23Q 7/00* | (2006.01) |
| *B23Q 1/56* | (2006.01) |
| *B23Q 15/22* | (2006.01) |
| *B66F 19/00* | (2006.01) |
| *G05D 3/12* | (2006.01) |

(52) U.S. Cl.
CPC .............. *B23Q 7/005* (2013.01); *B23Q 1/56* (2013.01); *B23Q 15/22* (2013.01); *B66F 19/00* (2013.01); *G05D 3/12* (2013.01); *G05B 2219/50046* (2013.01)

(58) Field of Classification Search
CPC ..................... B23Q 7/005; G05B 2219/50046
See application file for complete search history.

(56) References Cited

U.S. PATENT DOCUMENTS

| | | | | |
|---|---|---|---|---|
| 4,426,201 | A * | 1/1984 | Cohen ..................... | B29C 45/20 425/147 |
| 5,427,349 | A * | 6/1995 | Obrecht ................. | B21D 28/00 248/188.4 |

(Continued)

OTHER PUBLICATIONS

European Search Report dated Feb. 9, 2015 from Italian Patent Application No. MI20140997 filed May 29, 2014.
(Continued)

*Primary Examiner* — Thomas Randazzo
(74) *Attorney, Agent, or Firm* — Sunstone IP

(57) ABSTRACT

The object of the present invention is a device for moving a load and for the control thereof, particularly for regulating the positioning and/or orientation of a first plane, for example that is integral with an automatic machine, with respect to a reference plane or direction, for example that of the force of gravity. More specifically, the present invention consists of a device that makes it possible to move at least a number of points of the lower portion of an automatic machine and/or of the surface of an object along at least one axis (C), so as to regulate the orientation and/or inclination of the machine and/or object with respect to a reference direction.

18 Claims, 5 Drawing Sheets

(56) References Cited

U.S. PATENT DOCUMENTS

| | | | | |
|---|---|---|---|---|
| 5,722,639 A * | 3/1998 | Nonaka | ............. | B24B 41/06 254/104 |
| 6,042,097 A * | 3/2000 | Ikawa | ............. | B23Q 1/26 254/104 |
| 6,244,569 B1 * | 6/2001 | Canella | ............. | B23Q 7/005 254/104 |
| 6,328,282 B1 * | 12/2001 | Haney | ............. | B66F 19/00 254/104 |
| 6,702,246 B1 * | 3/2004 | Schriever | ............. | F16M 7/00 248/656 |
| 7,087,143 B1 * | 8/2006 | Schmidt | ............. | C25D 7/12 118/416 |
| 7,290,648 B2 * | 11/2007 | Buonomo | ............. | B23Q 7/005 198/705.1 |
| 7,363,702 B2 * | 4/2008 | Kondo | ............. | H05K 13/0061 29/650 |
| 8,096,007 B2 * | 1/2012 | Dyreby | ............. | A47B 9/20 108/147 |
| 8,442,659 B2 * | 5/2013 | Wagner | ............. | H01L 21/67766 356/237.4 |
| 9,568,029 B2 * | 2/2017 | Lemke | ............. | B66F 3/30 |
| 2008/0237417 A1 * | 10/2008 | Liu | ............. | B23Q 5/326 248/188.4 |

OTHER PUBLICATIONS

International Search Report and Written Opinion dated Nov. 4, 2015 from International Patent Application No. JCT/IB2015/054013 filed May 28, 2015.

* cited by examiner

DEVICE AND PROCEDURE FOR MOVING A LOAD AND FOR THE CONTROL THEREOF

The object of the present invention is a device and procedure for moving a load and for the control thereof. In particular, the present invention concerns a device for regulating the positioning and/or orientation of a first plane, for example a plane integral with an automatic machine and/or with the plane of an object, with respect to a plane or a reference direction, for example that of the force of gravity.

More specifically, the present invention consists of a device that makes it possible to move at least a number of points of the lower portion of an automatic machine and/or of an object along at least one axis, so as to regulate the orientation and/or inclination of the machine and/or of the object with respect to a reference direction. When machining and/or treating an object using an automatic machine, it is often necessary or in any case highly desirable that the object being machined have a certain orientation with respect to at least one ideal reference plane, for example the plane substantially perpendicular to the force of gravity, or directly with respect to the direction of the force of gravity.

In general, the direction with respect to which the object to be machined must be oriented appropriately can consist of the direction of any straight line, so that the reference to the force of gravity is merely correlated to the fact that the instruments for detecting the inclination of an object are based on the angle between a given direction integral with the instrument and the direction of the force of gravity, as in the case of the conventional spirit level. In fact, it is assumed that the machining devices are resting correctly with respect to the force of gravity, and that they are used for machining starting from the assumption that the object to be machined is also in a certain position with respect to the force of gravity.

This serves for the purposes of precision in machining and/or treatment, the implementation of which is based on the assumption that the object is in a predetermined position with respect to the arrangement of the components of the automatic machine. Owing mainly to defects in the surface on which the machine rests, and/or because of structural deformations of the object, the object itself is frequently found in an improper position because it is resting on an actual rest plane that is integral with the structure of the machine, but incorrectly oriented with respect to the reference plane or the force of gravity.

For example, considering that the situation one is seeking for the purposes of correct execution of the operations to be performed by the machine is that in which the object is resting on an actual rest plane perpendicular to a reference plane, if the normal to the actual plane on which the object is resting is inclined with respect to the normal of the reference plane, the orientation of this actual rest plane must be modified. For this purpose, one then proceeds to adjust the height of one or more rest points of the machine on which the object must be placed, so as to modify as a result also the orientation of the actual rest plane for resting the object on the machine. Alternatively, it is possible to proceed with adjustment of the height of one or more rest elements for resting the object on the machine plane, so as to modify as a result also the orientation of the actual rest plane for resting the object on the machine.

The adjustment procedure for regulating the orientation of the actual rest plane for resting the object is currently carried out by detection, using manual or electronic means, of the orientation of the normal to this actual plane with respect to a reference plane. Detection is followed by one or more manual procedures for lowering and/or raising one or more rest points of the machine on the ground, using manually activated lifting means for raising these rest points.

Each manual displacement implies an unknown displacement of the plan of the machining device, and/or of the object to be machined. For this reason, following each displacement one then proceeds to check the new inclination of the normal to the actual rest plane and possibly intervene again on these rest points using the lifting means until reaching a satisfactory orientation of the actual rest plane on which the object to be treated/machined will be positioned, with respect to a reference direction.

In general, the objective is to orient a first ideal straight line perpendicular to a first ideal surface integral with the machine with respect to a second ideal straight line. To achieve this objective, usually the displacing and measuring procedures explained above and aimed at finding the desired inclination, must be performed at least twice.

In fact, the single detection means for detecting the inclination of the first straight line with respect to the second straight line allows for measurement of the angle between the projection of the first straight line and the projection of the second straight line on a plane integral with the detection means.

Considering the totally manual nature of the procedure for moving the rest points of the machine and/or the object, a considerable period of time is needed to regulate the orientation of the machine as desired and this involves a prolonged period of downtime, with a resulting increase in total costs for the user of the machine. Additionally, the manual nature of the procedures for intervening on the rest points of the machine and/or of the object on the plane of the machine does not allow for high precision in the amount of movement imparted to the individual rest point. This makes compensation for any elastic deformation very difficult and although such deformation may even be very slight, it can involve a positioning of the object to be machined that is inadequate for given tolerances.

In particular, this last disadvantage arises when one intends to machine or treat large objects, in which case one may wish to quantify the deformations and/or imperfections thereof compared to the nominal data. In this case, it is in fact necessary to intervene on one or more rest points of the object on this actual rest plane, using the same abovementioned manual lifting means, but with the latter being positioned between this actual rest plane for the object on the machine and the object itself.

Moreover, the manual nature of these procedures usually requires the presence of at least a first operator who provides for raising the rest points of the machine and a second operator in charge of detection of the new inclination of the actual rest plane of the object following the movements brought about by the first operator.

More specifically, in the event of intervention by an operator on the rest point of the machine, some safety risks are involved, considering that the manually-operated lifting devices are found in the lowermost part of the machine and/or in the vicinity of areas where the machine and relative apparatus for machining will be operating. Moreover, the means for adjusting the height of the rest points of the machine is found in areas that are fairly confined, which can make it necessary to disassemble parts of the machine, requiring more time and above all making it more difficult to perform the procedures for moving the rest points.

In addition, currently such adjustments often have to be carried out by a skilled technician of the manufacturing firm on-site, as intervention requires a certain degree of experience.

One aim of the present invention is to offer a device and procedure for moving a load and for the control thereof that is capable of regulating the position and/or orientation of the rest plane of an object, for example on an automatic machine, with respect to a reference plane or to a reference direction, for example the direction of the force of gravity, that makes it possible to reduce the time employed for this adjustment and thus achieve a marked reduction in the costs associated with this adjustment, compared to current state-of-the-art methods.

Another aim of the present invention is to offer a device that makes it possible to simplify this procedure and to achieve better results, with respect to current state-of-the-art methods.

A further aim of the present invention is to offer a device that makes it possible for this adjustment to be carried out by an operator who may also not have been trained for intervention on the machine.

A yet further aim of the present invention is to offer a device that makes it possible to carry out this adjustment without requiring the presence of an operator in potentially risky areas of the machine, and thus increasing safety of the operator during the adjustment procedure.

These aims are achieved by means of a device for moving a load and the control thereof, comprising the technical characteristics set forth in one or more of the appended claims:
- a control unit configured to receive at least a first signal and to send a drive signal, as a function of at least this first signal;
- a motor configured to generate movement as a function of at least said drive signal;
- an actuator that is connected to said motor and configured to impart movement to said load as a function of at least said movement generated by the motor;
- measuring means fit for detecting a physical quantity physically correlated with said movement;

said control unit being at least partially programmed to control said movement generated by said motor as a function of at least said first signal and at least one detection carried out by said measuring means.

The preferred embodiment of the present invention can comprise at least one of the following aspects.

It preferably comprises transmission means for transmitting motion between said electric motor and said actuator.

The measuring means preferably comprises a sensor. The control unit preferably comprises a printed circuit board. It preferably comprises connection means fit for transferring the drive signal from the control unit to the motor, and said drive signal is effective for increasing and/or decreasing and/or regulating a speed associated with the movement generated by said motor. It preferably comprises connection means fit for transferring at least a second signal between the control unit and the measuring means, said second signal being effective for activation of at least part of the measuring means.

It preferably comprises connection means fit for transferring at least a third signal between the measuring means and the control unit, said third signal being at least partially correlated with the physical quantity detected by the measuring means.

The control unit is preferably fit for controlling the temporal pattern of the drive signal as a function of at least the third signal. The control unit is preferably fit for controlling the temporal pattern of the drive signal based on at least the first signal. The control unit is preferably fit for controlling the temporal pattern of the drive signal based on at least the first signal and at least the third signal.

The actuator preferably comprises a movement means with inclined planes comprising a member fit for mutually sliding said inclined planes.

The member is at least partly threaded.

The motor preferably comprises a drive shaft.

The physical quantity is preferably correlated with a rotation of the drive shaft.

The sensor preferably comprises an encoder.

The motor is preferably an electric motor.

The transmission means preferably comprise a belt. The transmission means preferably comprise a first pulley and a second pulley.

The first pulley is preferably fit for being rotated by virtue of the motor and functions as the drive wheel, and the second pulley is fit for rotating the actuator member and functions as the driven wheel. Preferably, the first pulley and the second pulley are toothed, the belt is toothed, and the pulleys mesh on the belt.

The transmission means preferably comprise a mechanism that comprises at least one gear.

The mechanism preferably comprises a planet gear. The mechanism is preferably arranged before the belt, in the direction of motion from the motor to the actuator.

The mechanism, the first pulley, the belt and the second pulley are preferably arranged sequentially in the direction of motion from the motor to the actuator.

The motor and the first pulley are preferably arranged in a direction opposite the direction according to which the second pulley and the actuator are arranged, considering their projections on a plane perpendicular to the direction according to which the actuator acts.

The motor is preferably alongside the actuator, considering their projections on a plane perpendicular to the actuation direction of the actuator.

For example, the load can consist of:
- an object or a part of an industrial machine that carries out a given machining process;
- a rest plane of an object of the industrial machine, in which the rest plane is regulated in terms of position and/or orientation with respect to a reference plane;
- a plane of a structure, in which said plane is regulated in terms of position and/or orientation with respect to a reference plane.

The first signal which the control unit is fit for receiving can come from a personal computer, a notebook, a mobile telephone (such as a smartphone) or a tablet, or from similar devices.

Advantageously, the device that sends the first signal comprises a transmitter configured for wireless transmission of this first signal to the control unit and the control unit for controlling the movement device is associated with a suitable receiver.

The wireless technology utilized is preferably of the WIFI or Bluetooth type.

The characteristics of the present invention shall be further clarified in the following detailed description provided by way of non-limiting example of the more general concepts claimed.

The detailed description refers to the attached figures, of which:

Figure 1:
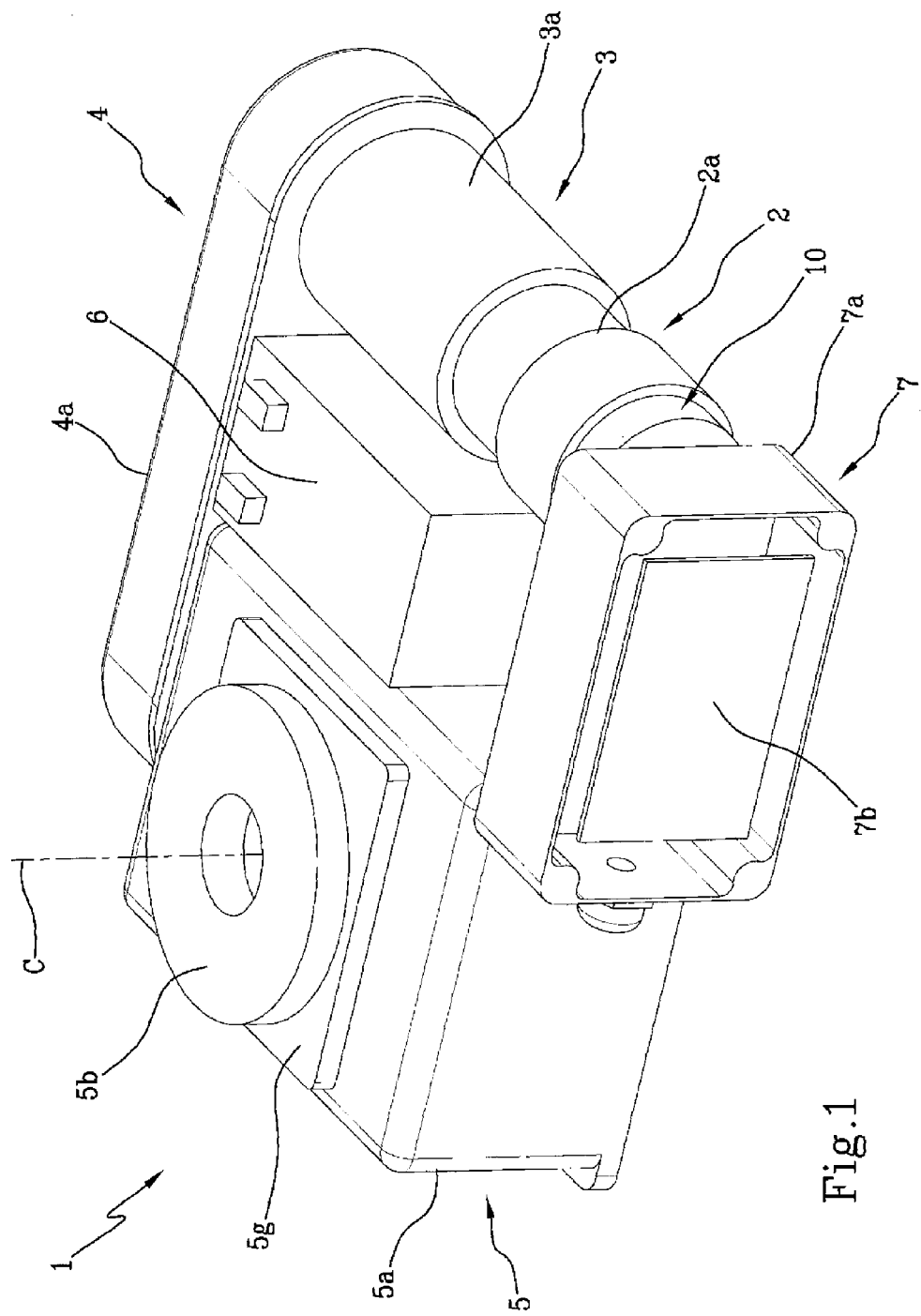
FIG. 1 is a schematic perspective view of a device for moving a load and for the control thereof according to the present invention.

A schematic perspective view is shown in FIG. 1 representing a possible embodiment of a device 1 (or system) for moving a load and for the control thereof according to the present invention.

This device is fit for moving, particularly remotely, objects of any size and weight (including significant sizes and weights) so as to bring about a given movement. In particular, this device can find application in all situations that require levelling of an object, defining the entity of the movement beforehand, for example to bring about the positioning/levelling of objects/parts for machining them and/or the levelling of entire machines or structures.

Advantageously, the device according to the present invention comprises a motor 2, the outer casing 2a of which can be seen in the attached figures. The motor 2 is preferably an electric type of motor.

In accordance with a possible embodiment, the device 2 comprises transmission means 3 and 4 for transmitting movement generated by the motor 2 and that are operatively interposed between the motor 2 and an actuator 5 fit for lifting a load. In accordance with a possible embodiment, the transmission means 3 and 4 are contained in two casings 3a and 4a.

With reference to FIG. 1, the actuator 5 comprises an outer casing 5a and a yoke 5b that can translate, in this embodiment, along an axis C. The actuator 5 is preferably partially located inside the casing 5a so as to protect the structure thereof.

Figure 2:
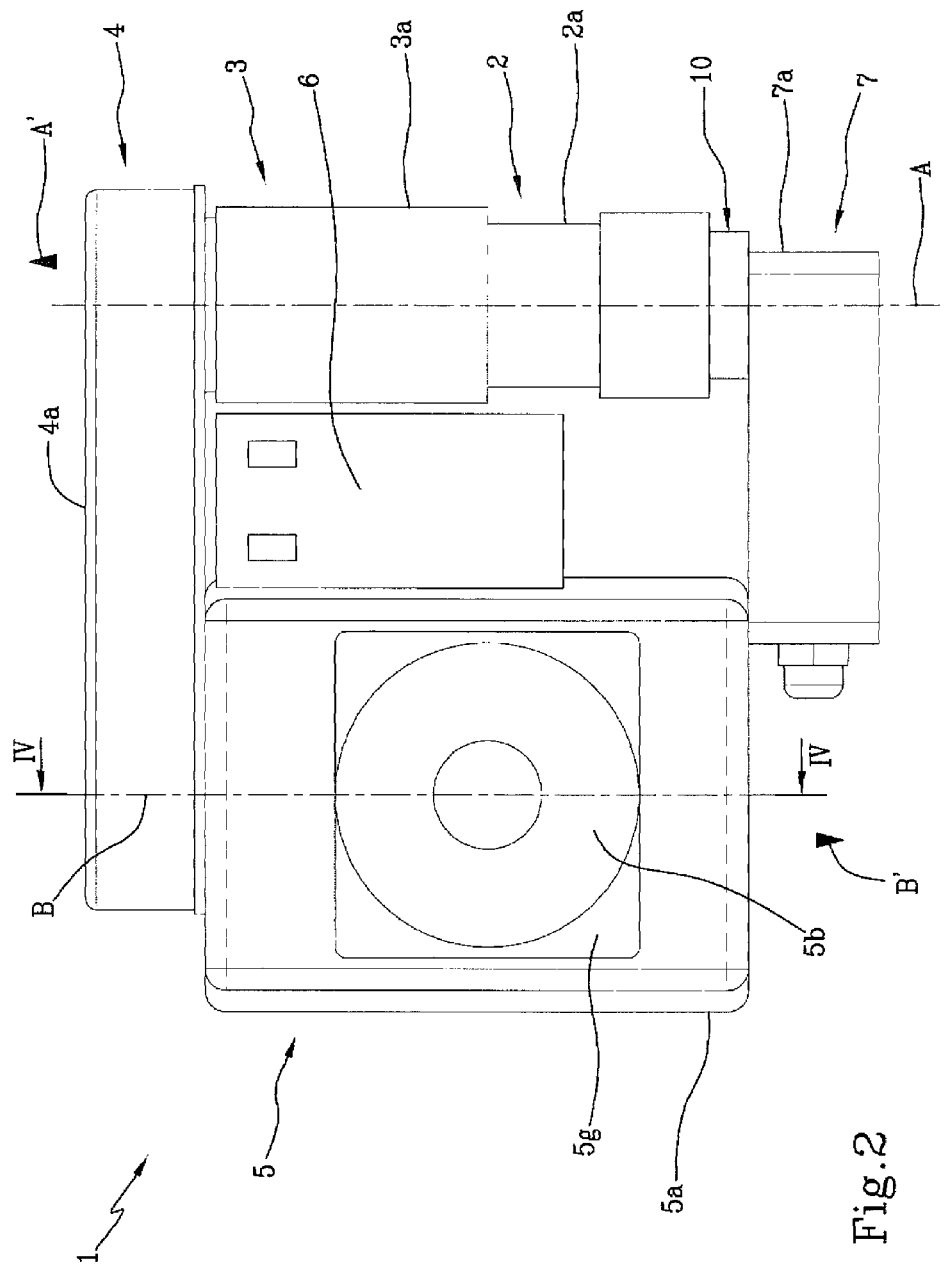
FIG. 2 is a schematic view from above of the device of FIG. 1.
Figure 4:
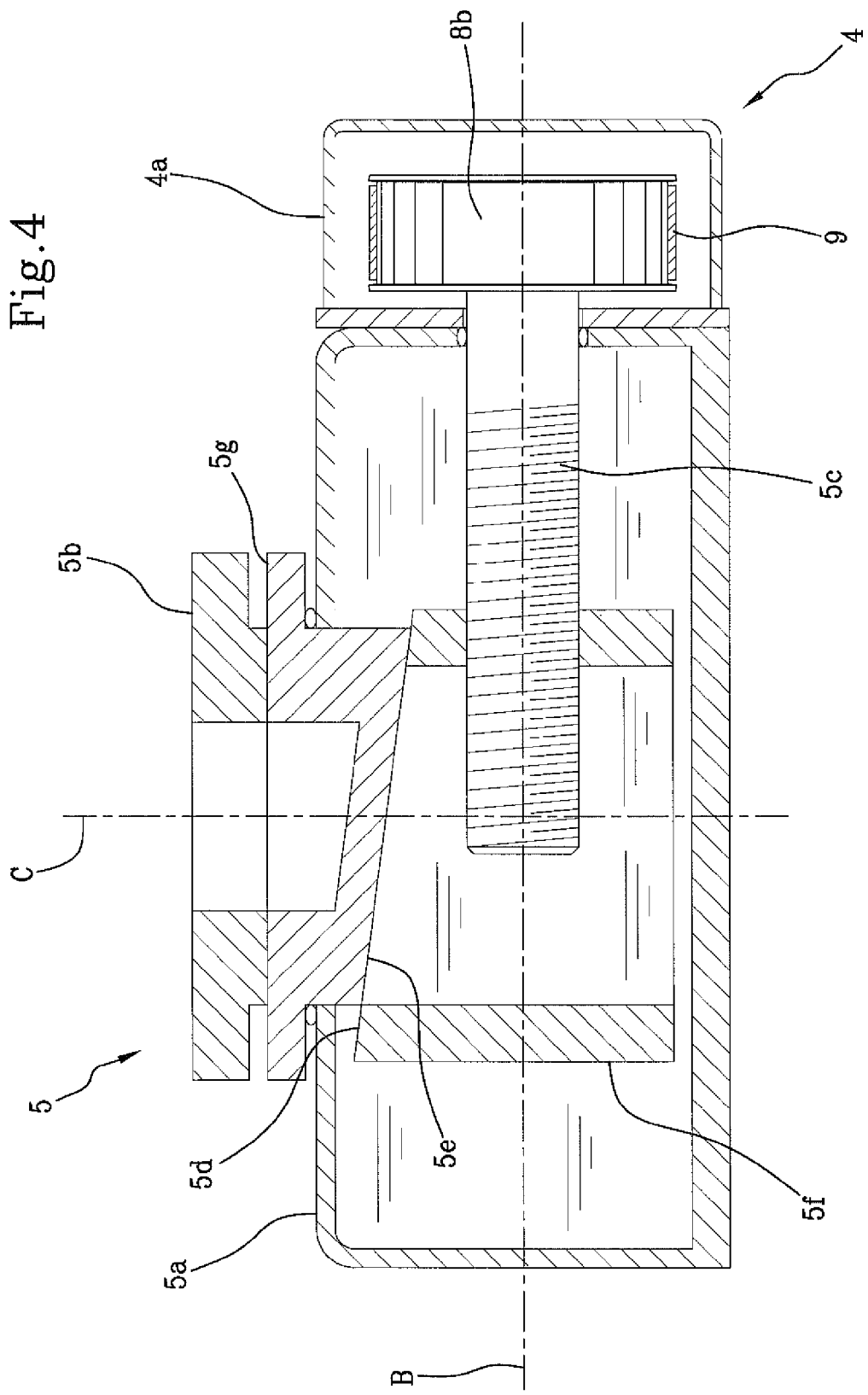
FIG. 4 is a schematic sectional side view of the device taken along line IV-IV of FIG. 2.

The actuator 5, of which a section taken along line IV of FIG. 2 appears in FIG. 4, advantageously comprises a member 5c fit for mutually sliding inclined planes 5d and 5e of a leveler with inclined planes. A type of actuator 5 according to the preferred embodiment of the present invention comprises a member 5c that is at least partly threaded.

With reference to the embodiment of FIG. 4, the inclined plane 5d is integral with a lower support 5f in which the at least partly threaded member 5c is inserted. The yoke 5b is integral with a lower plate 5g, which exhibits the inclined plane 5c that slides on the inclined plane 5d.

The lower support 5f is preferably perforated so as to decrease the friction surface of the member 5c and to reach a satisfactory compromise between the sliding speed of the load along the axis C and the power required of the motor.

The plate 5g and the yoke 5b are also preferably perforated to save material.

In FIG. 2, which represents a view from above of a preferred embodiment of the present invention, it is possible to distinguish a portion of the inclined plane 5d integral with the lower support 5f.

In FIG. 4 it is possible to see that the rotation of the member 5c determines translation along an axis B of the lower support 5f and thus the relative sliding between the inclined plane 5e and the inclined plane 5d.

This sliding brings about the translation of the yoke 5b, which is preferably a single piece integral with the plate 5g, along the axis C.

In the preferred embodiment, the casing 5a is sealed, and internally defines a sealed chamber filled with oil.

In other words, the mechanical parts of the device 1, namely the plate 5g, the member 5c and the lower support 5f are drowned in an oil bath.

In this respect, proper gaskets are provided and associated to the plate 5g and to member 5c, in order to hydraulically isolate the inside of the casing 5a (or the room) from the outside.

These gaskets are preferably anchored to the housing 5a and are slidably attached to the plate 5g and member 5c.

Advantageously, in such a way the device 1 can also be placed in wet areas or processing areas where there is a high concentration of chips, cooling liquids, dusts or other external agents.

Figure 3:
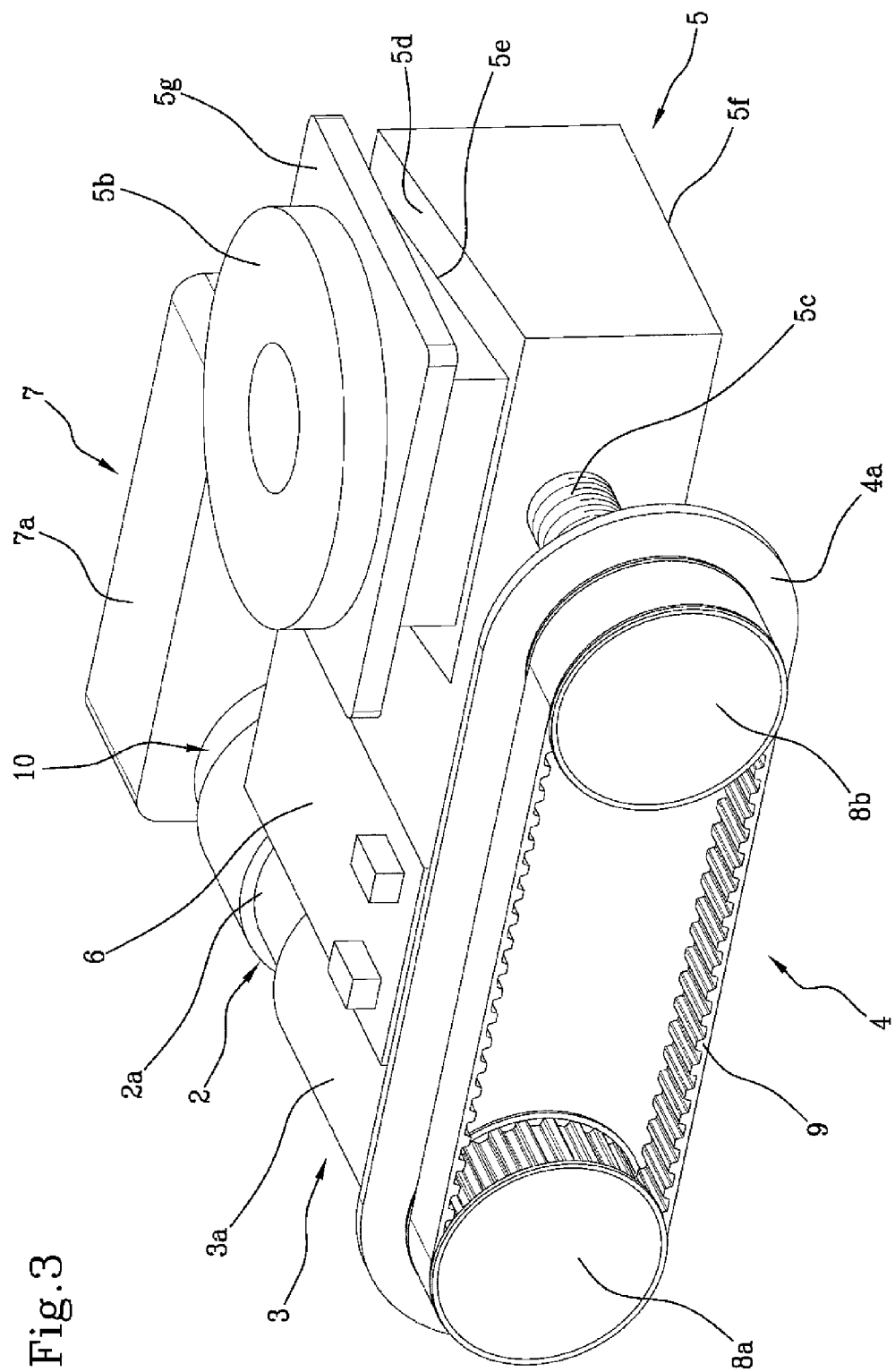
FIG. 3 is another schematic perspective view of the device of FIG. 1 from a different angle.

With reference to FIGS. 1-3, the device 1 preferably comprises a battery 6 suitably equipped with adequate means for connection with the components of the device.

Advantageously, the presence of a battery avoids the need to wire the device, which is particularly appreciable in applications such as machining with chip removal or the like, in which there are several moving members and big quantities of coolant.

Preferably, the battery 6 is the type Lithium-Polymer (LiPo).

Advantageously, in this way, the battery is of small dimensions, suitable shape and limited weight. In other words, the use of a battery 6 LiPo helps to limit both the size and the weight of the device.

In accordance with a possible embodiment, the device 1 comprises a control unit 7.

This control unit 7 comprises for example a printed circuit board 7b configured to receive at least a first signal S1 (FIG. 5), for example from a computer. The printed circuit board 7b is preferably located inside a box 7a.

In the preferred embodiment, the control unit 7 comprises a communication module with a remote control device.

In other words, the communication module is configured to send and/or receive data from said remote device, preferably by a user interface module.

More precisely, the device 1, and in particular the control unit 7 comprises communication means 11 associated to the printed circuit board 7b to allow the driving of the motor 2 through a communication network.

In detail, the communication means 11 comprise an interface 12 module accessible from a remote device PC (eg. PC, smartphone or tablet) to send to said control unit 7, and in particular to the printed circuit board 7b, said first signal S1.

In the preferred embodiment, the communication means 11 include a router configured to establish a permanent connection to the communication network, so as to allow access to the control unit 7 by the remote device PC.

This router is used for the wireless communication by using the tool, and, preferably, through band 3G and/or 4G, can support technologies as GPRS, EDGE, UMTS, HSDPA and HSUPA.

In the preferred embodiment, the communication network is based on IP type a protocol.

Therefore, the router is configured to maintain its own IP address (static IP) facilitating access to the device 1.

In the preferred embodiment, the interface module 12 is a web application through which the user can drive the engine 2 even remotely, by sending the first signal S1 to the control unit 7 via the communication means 11, i.e. the router, using the communication network mentioned above.

According to a possible embodiment, the first signal S1 is advantageously correlated with a movement to be imparted to the load. In particular, the printed circuit board 7b is programmed to control, by means of a drive signal, a movement generated by the motor 2 as a function of at least the first signal and at least a physical quantity corresponding to a given position or configuration of the motor. For example, this physical quantity can be detected by measuring means 10 that preferably comprises a sensor 10, for example an encoder, and the measuring means 10 is advantageously arranged in the proximity of the motor 2.

In the preferred embodiment, the encoder 10 is of the incremental type. However, preferably, this encoder is associated to the control unit 7, in particular to the electronic card 7b to send it a third relative signal S3'. The electronic board 7b is in turn programmed to process this signal S3' in order to render it absolute, thus making accurate the self-measurement performed by the device and, at the same time, obtaining such a result cheaply.

The printed circuit board 7b stops the motor 2 when the movement imparted by the actuator 5, for example from the yoke 5b, reaches the value set preferably by the user by sending the first signal and by means of the computer for example. The battery 6, if present, is suitable for supplying the motor 2 and/or the at least partially electronic components, such as the control unit 7 or the sensor.

In the preferred embodiment of the present invention, the transmission means 4 comprises a pair of pulleys 8a and 8b and a belt 9. In FIG. 3, the casing 4a containing the belt 9 and pulleys 8a and 8b is only partially shown.

A first pulley 8a is fit for being rotated by virtue of the motor 2 and functions as the drive wheel, whereas a second pulley 8b is fitted onto the member 5c and functions as the driven wheel. The casing for the actuator 5 is not shown in FIG. 3 and therefore it is possible to observe the lower support 5f in which the member 5c is inserted, the rotation of which makes the inclined plane 5d slide with respect to the inclined plane 5e of the plate 5g, thereby bringing about upward translation of the yoke 5b.

The first pulley 8a and the second pulley 8b are preferably toothed and they engage with the toothed belt 9.

Preferably, the transmission means 3, for example as illustrated in FIGS. 1-3, comprise at least one mechanism contained in the casing 3a and comprising at least one gear, which can be part of a planet gear. In the preferred embodiment, the mechanism comprises a planetary gear multistage, preferably at least three stages arranged in a cascade (series).

In this way it is possible to obtain a reduction ratio up to 1:3000.

Advantageously, in this way it is possible to use a motor 2 of small size (eg. 150 W) while ensuring the possibility to handle high loads.

In the direction of motion from the motor 2 to the actuator 5, this mechanism, particularly the planet gear, is preferably arranged before the belt 9, as can be noted in FIG. 3.

As is observable in FIGS. 1-3, the preferred embodiment of the present invention comprises that the mechanism contained in the casing 3a, the first pulley 8a, the belt 9 and the second pulley 8b (the latter being contained in the casing 4a and are thus not observable in FIGS. 1 and 2) are arranged sequentially in the direction of motion from the motor 2 to the actuator 5.

As is observable particularly in FIG. 2, the motor 2 and the first pulley 8a are arranged along an axis A in a direction A' opposite the direction B' according to which, along axis B, the second pulley 8b and the actuator 5 are arranged, considering the projections of these components on a plane perpendicular to the direction according to which the actuator 5 acts and translates the yoke 5b, such as the plane shown in FIG. 2 for example.

In this manner, the motor 2 is alongside the actuator 5, considering their projections on a plane perpendicular to the actuation direction of the actuator 5. This aspect assures a good degree of compactness. Moreover, it can be noted in FIG. 2 that the actuator 5 and the second pulley 8b are aligned along the axis B, which is parallel to the axis A along which the motor 2 and the first pulley 8a are aligned.

Figure 5:
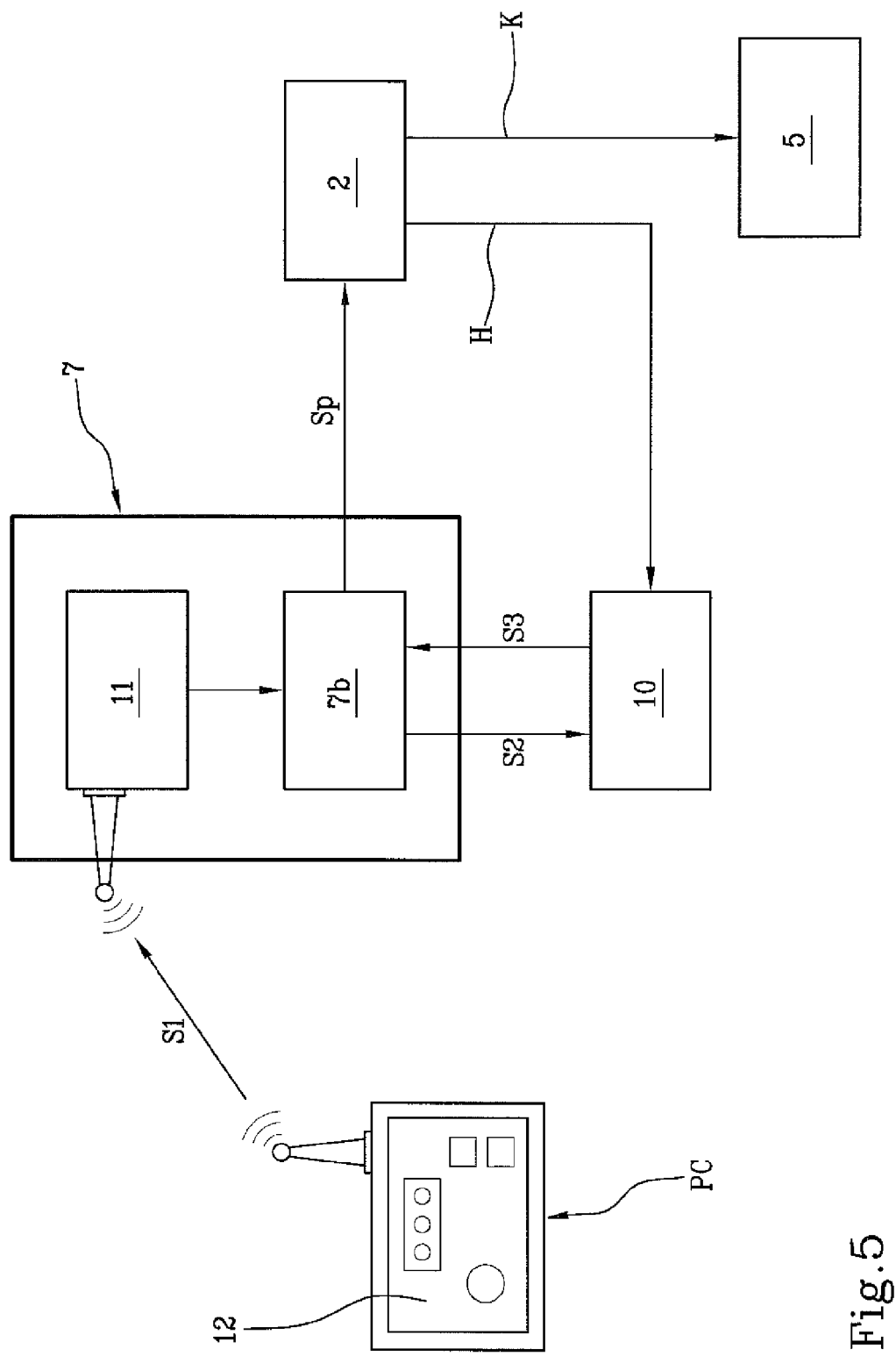
FIG. 5 is a block diagram of the device according to the present invention.

With reference to FIG. 5, there is a diagram of the device in which the motor 2, the actuator 5 and the printed circuit board 7b are schematically shown. A remote device (such as a computer, a smartphone, etc.) by means of which the user can interact with the device as described above and below is indicated as PC.

The sensor fit for detecting a movement parameter correlated with the movement of the motor 2 is indicated by the number 10. The movement parameter detected by the sensor 10, in the preferred embodiment of the present invention, is expressed by the number of revolutions carried out by a drive shaft of the motor 2.

According to a preferred embodiment of the device 1 according to the present invention, the device comprises connection means fit for transferring at least a drive signal Sp between the printed circuit board 7b and the motor 2. This drive signal Sp can be advantageously effective for increasing and/or decreasing and/or more generally for regulating a speed associated with the movement generated by the motor 2. In particular, the drive signal can be advantageously effective for increasing and/or decreasing and/or more generally for regulating a rotation speed of a possible drive shaft of the motor 2. In this manner, the printed circuit board 7b can move and/or activate the actuator 5, based on detections carried out by the sensor 10 and based on the first signal S1. This first signal S1 is preferably proportional to a numeric value entered in the remote device PC, by means of the interface module 12, by the user and corresponding to the movement value one wishes to impart to the load by means of the yoke of the actuator 5.

The device 1 preferably also comprises connection means fit for transferring at least a second signal S2 between the printed circuit board 7b and the sensor 10. The second signal is preferably effective for activating the sensor 10. In this manner, the printed circuit board 7b can act in such a manner that the sensor 10 is activated only when the motor 2 is activated by the same printed circuit board 7b, so that at least one detection by the sensor 10 can be correlated with a movement parameter, which is, in turn, correlated with movement that the motor 2 has generated since it was activated. This movement generated by the motor 2 is, in turn, correlated with the movement imparted by the actuator 5 and therefore with the movement that the load has undergone, defining the link between at least one detection by the sensor 10 and the movement to which the load has been subjected.

The device 1 can advantageously comprise connection means fit for transferring at least a third signal S3 between the sensor 10 and the printed circuit board 7b. The third signal S3 is associated with at least one detection by the sensor 10, based on which the printed circuit board controls the movement generated by the motor 2, and therefore the movement that the load has undergone, by means of the drive signal Sp.

The printed circuit board 7b is preferably programmed so as to be configured to control the drive signal Sp based on and/or as a function of at least the first signal S1. In this manner, the printed circuit board 7b can accelerate, slow down and more generally regulate the movement generated by the motor 2 based on the movement that the user intends to impart to the load.

The printed circuit board 7b is preferably programmed so as to be configured to control the drive signal Sp based on and/or as a function of at least the third signal S3, which, for the reasons specified hereinabove, is correlated with the movement to which the load has been subjected.

The printed circuit board 7b is preferably programmed so as to be configured to control the drive signal Sp based on and/or as a function of at least the first signal S1 and third signal S3, which, as stated above, are correlated with the movement that the user wishes to impart to the load and to the movement to which the load has been subjected, respectively.

As can be noted from the arrows in FIG. 5, a personal computer PC preferably sends the movement desired by the user, in the form of the first signal S1, to the printed circuit board 7b that is programmed in such a manner as to start up and regulate the movement generated by the motor 2, by means of the drive signal Sp, and based on detections by the sensor 10, which reach the printed circuit board 7b in the form of the third signal S3, and based on this first signal S1. The starting up of the sensor 10 by the printed circuit board 7b takes place for example by means of a second signal S2, whereas regulation and/or control of the movement and thus of the movement generated by the motor 2, and therefore also the start-up thereof, takes place by means of the drive signal Sp.

By means of the transmission means, which are not indicated in FIG. 5, but are preferably found at the level of the arrow K, the motor 2 acts on the actuator 5, which, in turn, brings about the movement of the load. The arrow H between the motor 2 and the sensor 10 indicates that the sensor is connected to the motor 2 so as to enable detection of at least one parameter relative to the movement generated, and the arrow between the sensor 10 and the printed circuit board 7b indicates that at least one detection by the sensor 10 has been communicated to the printed circuit board 7b, by means of the third signal S3. The signals described above can be transferred by means of suitable connection means between the various components, which can be of an at least partially electronic type, such as a transducer associated with a conversion element, both being located between the sensor 10 and the printed circuit board 7b.

Preferably, the control unit 7, and in particular the printed circuit board 7b, are configured to drive the motor 2 so as to recover the intrinsic play of said planet gear.

More precisely, the printed circuit board 7b is programmed to drive the motor 2, and the actuator 5, so that the target position, imparted by the user through the interface module 12, is always reached with a movement direction opposite to the load, or to gravity.

In other words, if the target position is at a greater height with respect to the detected position, the printed circuit board 7b drives the engine 2 so as to lift the load so as to reach the target position thereof.

By contrast, if the target position is at a lower height with respect to the detected position, the printed circuit board 7b drives the engine 2 so as to lower the load until reaching a stop position lower than the target position, then again driving the motor 2 in the opposite direction, so as to lift the load until reaching the target position.

Advantageously, always working in opposition to the load, it is possible to avoid the play of the planet gear, "normalizing" the measurement.

Note that, preferably, the interface module 12 is switchable in two distinct modes.

A first mode, already described, provides that the user can set the desired displacement and that the control board 7b drives the motor 2 accordingly. In a second mode, or jog mode, the user interface is configured to send to the control unit 7 a first signal S1 representative of a movement of duration equal to the time command from the user.

In other words, in this mode, the interface module 12 comprises a control member controlled continuously by the user and representative of a movement in a direction of ascent or descent.

Upon release of the control member by the user, the interface module is configured to send to the control unit 7 a first signal S1 representative of a stop of the engine 2.

Preferably, in this mode the control unit 7 is in turn configured to send to the interface module 12, always through the communication means 11, a signal representative of the instantaneous displacement of the load, or the third signal S3.

Said interface module, including at least one visualization module programmed to display user data of instantaneous displacement, thereby allowing a "manual" driving of the device 1.

According to a possible aspect, the present invention concerns a procedure for use of the device 1, in which said procedure comprises the step of orienting a first ideal straight line perpendicular to a first ideal surface integral with a machine with respect to a second ideal straight line that can be perpendicular to a second ideal reference surface. This orientation is carried out based on at least one detection of this inclination by means of an inclination detector that is preferably electronic and offering precision and/or accuracy in the micron range. The orientation of the first ideal straight line is carried out by modifying the position of some points of the first ideal surface using a device as described hereinabove. This first ideal surface preferably comprises a work surface of this machine, for example resting on a number of actuators 5, and the second ideal reference surface is parallel preferably to the force of gravity.

The machine is preferably an industrial machine for machining and/or treating objects and it comprises a device as described hereinabove, and in particular a plurality of actuators, each being fit for moving a portion of the machine and therefore of the work surface.

The invention claimed is:

1. A device for moving a load and for the control thereof, wherein said device comprises:
   a control unit configured to receive at least a first signal and to send a drive signal, as a function of at least this first signal;
   a motor configured to generate movement as a function of at least said drive signal;
   an actuator that is connected to said motor and configured to impart movement to said load as a function of at least said movement generated by the motor;
   measuring means fit for detecting a physical quantity physically correlated with said movement;
   said control unit being at least partially programmed to control said movement generated by said motor as a function of at least said first signal and of at least one detection carried out by said measuring means;
   wherein said device comprises transmission means for transmitting motion between said motor and said actuator, said transmission means comprising a first pulley and a second pulley that are both toothed, and a belt that is toothed, said pulleys meshing on said belt; and wherein said motor and said first pulley are arranged in a direction opposite the direction according to which said second pulley and said actuator are arranged, considering their projections on a plane perpendicular to the direction according to which said actuator acts.

2. The device according to claim 1, comprising connection means fit for transferring said drive signal from said control unit to said motor, and wherein said drive signal is effective for increasing and/or decreasing and/or regulating a speed associated with the movement generated by said motor.

3. The device according to claim 1, comprising connection means fit for transferring at least a second signal between said control unit and said measuring means, said second signal being effective for activation of at least part of said measuring means.

4. The device according to claim 1, wherein said control unit is fit for controlling a temporal pattern of said drive signal based on at least said first signal.

5. The device according to claim 1, wherein said motor comprises a drive shaft and said physical quantity is correlated with a rotation of said drive shaft.

6. The device according to claim 1, wherein said measuring means comprises an encoder.

7. The device according to claim 1, wherein said transmission means comprise a mechanism that comprises at least one planet gear.

8. The device according to claim 1, wherein:
said transmission means comprises a mechanism that comprises at least one planet gear; and
said mechanism, said first pulley, said belt, and said second pulley being arranged sequentially in the direction of motion from said motor to said actuator.

9. The device according to claim 1, wherein said motor is alongside said actuator, considering their projections on a plane perpendicular to the actuation direction of said actuator.

10. The device according to claim 1, wherein the control unit comprises communication means associated with a printed circuit board to allow the driving of the motor through a communication network; said communication means being associated with an interface module accessible from a remote device (PC) to send to said control unit said first signal (S1).

11. The device according to claim 1, comprising connection means fit for transferring at least a third signal between said measuring means and said control unit, said third signal being at least partially correlated with said physical quantity detected by said measuring means.

12. The device according to claim 11, wherein said control unit is fit for controlling a temporal pattern of said drive signal as a function of at least said third signal.

13. The device according to claim 1, wherein said actuator comprises a movement means with inclined planes comprising a member fit for mutually sliding said inclined planes.

14. The device according to claim 13, wherein said device comprises a sealed casing internally defining said inclined planes handling means and said member.

15. The device according to claim 13, wherein said member is at least partly threaded.

16. A procedure for use of a device according to claim 1, wherein said procedure comprises the step of orienting a first straight line perpendicular to a first surface integral with a machine with respect to a second straight line that can be perpendicular to a second reference surface, based on at least one detection of this inclination by means of an inclination detector.

17. The procedure according to claim 16, wherein said detector is electronic.

18. An industrial machine for machining or treating objects, comprising a device according to claim 1.

* * * * *